United States Patent [19]
Watkins

[11] 4,193,688
[45] Mar. 18, 1980

[54] OPTICAL SCANNING SYSTEM

[75] Inventor: Robert A. Watkins, Santa Barbara, Calif.

[73] Assignee: Raytheon Company, Lexington, Mass.

[21] Appl. No.: 84,711

[22] Filed: Oct. 28, 1970

[51] Int. Cl.² .............................................. F41G 7/00
[52] U.S. Cl. .................................. 356/152; 244/3.16; 250/203 R; 250/332; 250/342; 250/347; 250/349
[58] Field of Search .............. 250/83.3 H, 220 R, 235, 250/203 R, 347, 349, 342, 332; 350/7; 244/3.16; 356/152

[56] References Cited

U.S. PATENT DOCUMENTS

| 3,449,035 | 6/1969 | Denaro | 350/7 |
|---|---|---|---|
| 3,471,697 | 10/1969 | Riddle | 250/83.3 H |

OTHER PUBLICATIONS

Handbook of Chemistry and Physics, forty-fourth Edition, Hodgman et al., Chemical Rubber Publishing Co., 1963, pp. 361, 362.

Primary Examiner—Benjamin R. Padgett
Assistant Examiner—Deborah L. Kyle
Attorney, Agent, or Firm—Richard M. Sharkansky; Joseph D. Pannone

[57] ABSTRACT

An optical scanning system wherein infrared energy radiating from an object is directed to a Porro prism, such Porro prism being rotatable about the boresight axis of the optical scanning system so that the image of the object rotates, in the image plane of such system about its boresight axis, at an angular rate twice that of the Porro prism. A linear array of infrared detector elements is disposed in the image plane radially from the boresight axis of the scanning system. The angular deviation of the object from the boresight axis of the scanning system is measured by determining: (1) the angular position of the Porro prism when one, or more, of the infrared detector elements in the linear array is energized; and (2) which one, or ones, of such elements is energized.

7 Claims, 8 Drawing Figures

OPTICAL SCANNING SYSTEM

BACKGROUND OF THE INVENTION

This invention relates generally to optical scanning systems and particularly to an optical scanning system capable of determining the angular deviation of each point defining a scanned object from the boresight axis of such system.

A scanning system of the type herein contemplated generally comprises an optical system for focusing a portion of the electromagnetic energy radiating from objects within a field of view into a corresponding field containing images of such objects on a focal plane; at least one detector element disposed in such corresponding field and responsive to such focused electromagnetic energy to produce an electric signal analogous to each image; a scanning mechanism for cyclically moving the at least one detector element relative to the corresponding field in a prescribed manner; and a processor responsive to electric signals thereby produced to derive signals indicative of the position of each one of the objects within the field of view. Depending on the application of the system, the desired information may take various forms, ranging from the measurement of the relative angular position of each scanned object with respect to the scanning system to a two dimensional visual reproduction of each scanned object. The former type of information is useful in a basic guidance system for guiding a missile towards a target, while the latter type of information is useful in more sophisticated guidance systems where, say, a measurement and identification of the plume of the jet exhaust of a target aircraft is required for improvement of the kill probability of the missile system.

The precision and speed of operation of a scanning system are, inter alia, functions of the number of detector elements scanning a field of view and the rate at which such field is scanned. Therefore, in applications where the required precision and/or speed of operation of the scanning system makes it necessary to use more than one detector element, a linear array of detector elements has frequently been employed, each one of such detector elements being responsive to electromagnetic energy from a different part of the field of view. Thus, a scan pattern using such a linear array may be formed by disposing the detector elements in a line parallel to one dimension of a two dimensional field of view and translating such detectors across the second dimension of the field of view. One scheme typically employed is to drive the detectors in periodic or sinusoidal motion back and forth to scan the field of view; however, since it is desirable to have a substantially constant scan rate the linear array must be moved beyond the limits of the prescribed field of view. Another scheme to achieve a substantially constant scan rate is to use a mechanical cam arrangement. A difficulty of such a cam arrangement is that high accelerations are required at the edges of the scanned field of view. In order to reduce such high accelerations, it is known to dispose a linear array of detector elements in a line parallel to one selected dimension of the field of view and rotate such linear array about an axis coaxial with the center of the field of view. In such a scan pattern the orientation of the linear array of detector elements is always maintained parallel to the selected dimension of the field of view. This latter scan pattern, however, has the disadvantage of scanning the imaged object in the direction parallel to the array during a portion of the scan cycle, thereby reducing object resolution and increasing processing complexity. With a "cross" array arrangement (wherein a second linear array of detector elements is disposed orthogonally to a first linear array of detector elements) object resolution is improved at the price of adding still more complexity to the processor.

SUMMARY OF THE INVENTION

It is an object of the invention to provide a scanning for passive detection of objects with a field of view, such mechanism being simple, compact and efficient.

It is another object of the invention to provide a scanning system wherein the field of view of an imaged object is scanned at a constant rate with essentially unity scan efficiency by a simple, compact and efficient scanning mechanism.

It is another object of the invention to provide a compact, efficient scanning system for practical use in a guided missile whereby a scanned object can be reproduced in two dimensions.

These and other objects of the invention are attained generally by providing a scanning system wherein a portion of the electromagnetic energy radiating from each point defining a viewed object is focused onto an image plane and the image of such point revolved in a circle at a constant angular speed by a rotating Porro prism, each such imaged point thereby tracing a circle about the boresight axis of the scanning system, the radius of each such circle being proportional to the angular deviation of each corresponding point from the boresight axis. A plurality of adjacent detector elements, each responsive to focused electromagnetic energy impinging thereon from a different portion of the field being scanned is disposed radially from such boresight axis along a reference axis to form a linear array of detector elements in the image plane. The polar coordinates of each point defining a viewed object (meaning the angular distance, $\theta$, of each such point along the circle traced thereby from a reference point common to each circle and the angular deviation, R, of each such point from the boresight axis of the scanning system) are, therefore, measurable by determining: (1) the angular position of the Porro prism when one, or more, of the detector elements in the linear array is energized, and, (2) which one, or ones, of such elements is energized. In a missile guidance system, the polar coordinates of each point defining a viewed object are used to derive the control signals required to direct the missile to an intercept with a target; in a scanning system incorporating a display, such polar coordinates are processed further to actuate an indicator on which a visual representation of the field of view being scanned may be shown.

BRIEF DESCRIPTION OF THE DRAWINGS

Other objects and many of the attendant advantages of the invention will be readily appreciated as the same becomes better understood by reference to the following detailed description when considered in connection with the accompanying drawings wherein:

FIG. 2A is a plane view of the image plane of the invention to show the relation of an image at four different time periods;

FIG. 5 is a sectional diagrammatical representation, somewhat simplified, of the embodiment shown in FIG. 4;

FIG. 6, shows, in plan views, the relation of an image on the image plane of the optical arrangement shows in FIG. 5 seen through a Porro prism as the Porro prism is positioned at different angular orientations.

DESCRIPTION OF THE PREFERRED EMBODIMENT

Figure 1:
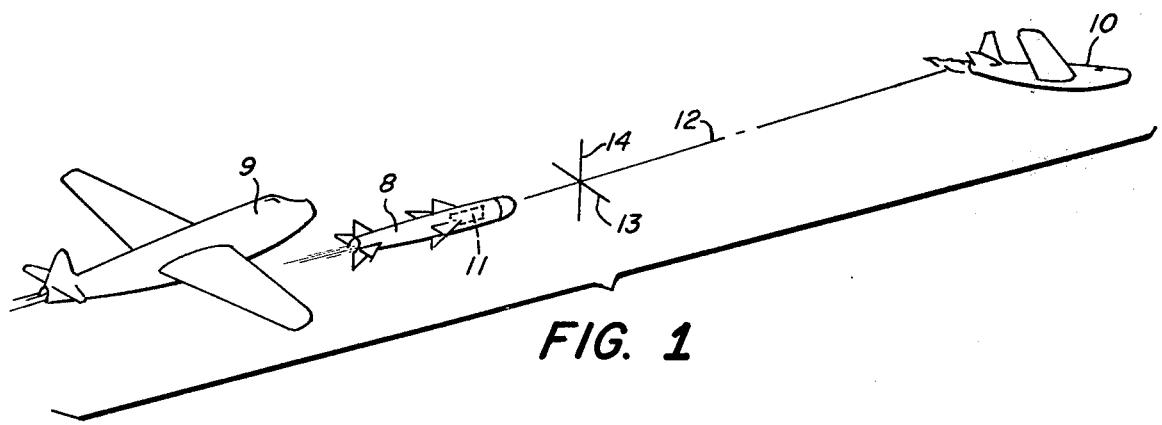
FIG. 1 shows a missile containing the invention launched from an aircraft and guided towards a target.

FIG. 1 shows a guided missile 8 launched from aircraft 9 and directed towards an object 10, such object here being a jet aircraft. Guided missile 8 carries, within its frontal portion (not numbered), a scanning system 11, such scanning system being responsive to that portion of the infrared energy radiated from object 10 and entering the frontal portion of missile 8. Scanning system 11 is gimballed to the body of missile 8 in a conventional manner by a gimbal system (not shown), so as to maintain the boresight axis 12 of scanning system 11 directed toward the centroid of the source of infrared energy entering the frontal portion of missile 8. Such orientation is maintained through a measurement of the angular deviation of such centroid from the azimuth axis 13 and elevation axis 14 of the scanning system 11 determined in a manner to be described hereinafter. The angular deviation measurements also provide information to the guidance system (not shown) of missile 8, such guidance system thereby generating appropriate missile maneuvers in a conventional manner to cause the missile 8 to intercept the object 10.

Figure 2:
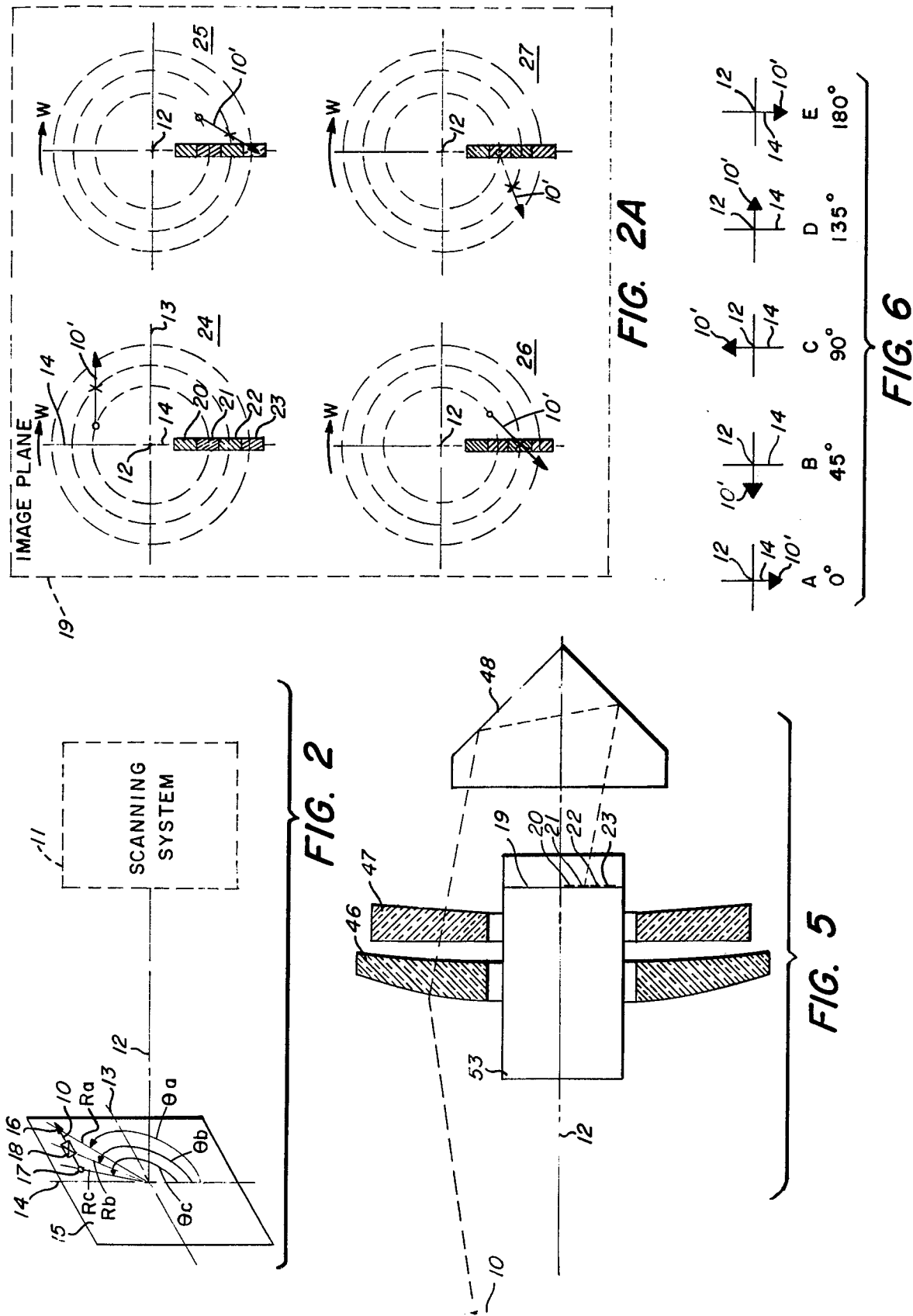
FIG. 2 is a simplified schematic diagram illustrating the principles of the invention.

FIGS. 2 and 2A show object 10 disposed in plane 15, the end points of such object here represented by arrowhead 16 and ball 17 and the centerpoint by cross 18. As is well known, the position of the selected points on the object 10 may be defined in a conventional manner by polar coordinates; the positions of arrowhead 16, ball 17 and cross 18 are here defined, respectively, as $(R_a, \theta_a)$, $(R_c, \theta_c)$ and $(R_b, \theta_b)$ as indicated. The scanning system 11 includes: An optical system for focusing a portion of the infrared energy radiating from object 10 into an imaged object 10' at an image plane 19; a scanning mechanism, including a rotating Porro prism for rotating, about boresight axis 12, each point defining imaged object 10', each such point rotating at a constant angular rate $\omega$ radians per second; detector elements, here four, (although any number could be used), 20, 21, 22 and 23, such detector elements being responsive to focused infrared energy and disposed in the image plane 19 along an axis corresponding to elevation axis 14 as shown; and, an electronic processor. The effect of the scanning mechanism is illustrated by four sequential plan views, 24, 25, 26 and 27 respectively, of image plane 19. View 24 shows the imaged object 10' at a time, t=0 sec., that is, at a time when the scanning mechanism is aligned with the reference axis 14. Views 25, 26 and 27 show the imaged object at times $t=t_1$, $t=t_2$, $t=t_3$ respectively where $t_1 = 2\pi\theta_a/\omega$, $t_2 = 2\pi\theta_b/\omega$ and $t_3 = 2\pi\theta_c/\omega$. It is, therefore, obvious that a measure of the relative radial deviation, R, of each point defining object 10 from boresight axis 12 may be made by determining the particular detector element responding to the infrared energy radiating from such point and the angular deviation, $\theta$, from reference angle 14 can be measured by determining the elapsed time between time t=0 sec. and the time at which each detector element response occurs. As is known, the angular deviation information required by the guidance system and the gimbal system is R cos $\theta$ for azimuthal commands and R sin $\theta$ for elevation commands.

Figure 3:
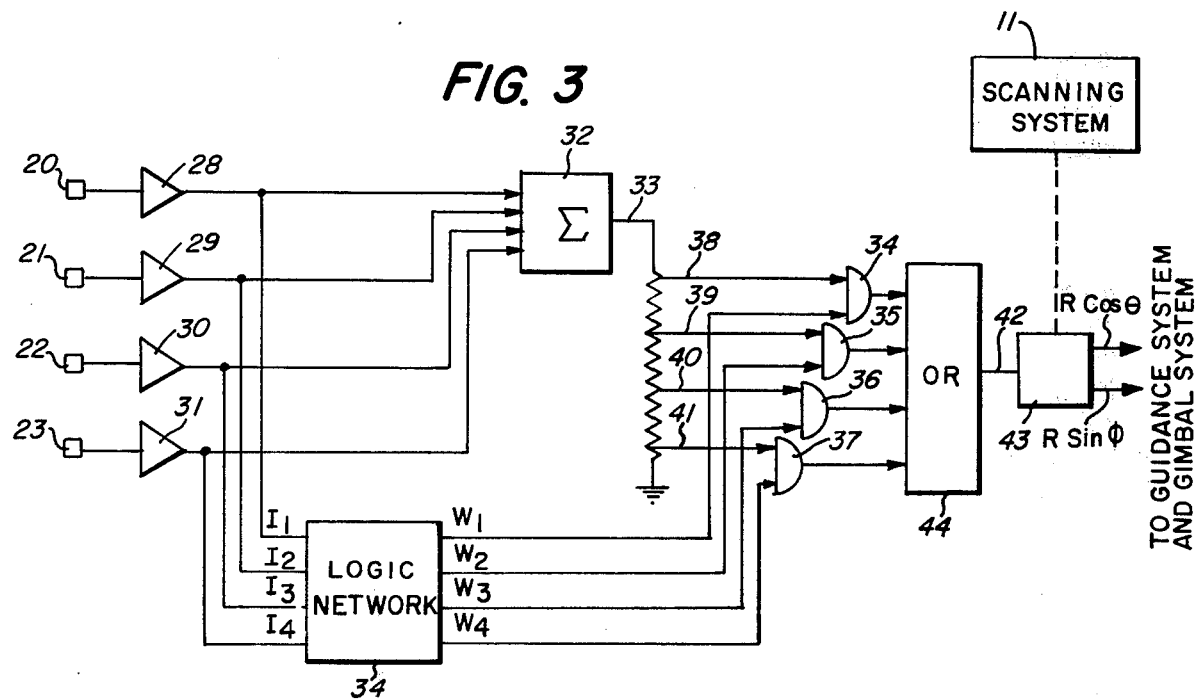
FIG. 3 is an electronic processor for use with the invention when the invention is used in a missile guidance application.

Referring now also to FIG. 3 it may be seen that the electrical signals produced by the response of detector elements 20 to 23 to focused infrared energy are first processed by amplifiers 28 to 31 respectively. Each one of such amplifiers is designed so as to produce a low level signal (here zero volts) until the signal out of its associated detector element 20 to 23 is greater than predetermined threshold level. When the signal produced by any one of the detector elements is greater than such predetermined threshold level, the corresponding one of the amplifiers 28 to 31 produces, respectively, a signal of constant voltage designated V1, V2, V3, V4 where V4>V3>V2>V1. The signals produced by amplifiers 28 to 31 are added together in adder 32, such adder being of conventional design, for producing a signal having a level equal to the sum of the applied signal levels, such sum signal $V_{33}$ being here represented by numeral 33. Consequently, such sum signal $V_{33}$ will be of a value V1, V2, V3 or V4 if a single one of the amplifiers 28, 29, 30, 31 produces a signal other than zero. However, if more than one such amplifier produces signals it is necessary that such sum signal $V_{33}$ be averaged. The required averaging process is here accomplished through use of signals $W_1$, $W_2$, $W_3$ and $W_4$, such signals being produced by a logic network 34. Such logic network may, for example, be a conventional diode matrix (not shown) which operates in accordance with the following truth table:

| $I_1$ | $I_2$ | $I_3$ | $I_4$ | $W_1$ | $W_2$ | $W_3$ | $W_4$ |
|---|---|---|---|---|---|---|---|
| 0 | 0 | 0 | 1 | 1 | 0 | 0 | 0 |
| 0 | 0 | 1 | 0 | 1 | 0 | 0 | 0 |
| 0 | 0 | 1 | 1 | 0 | 1 | 0 | 0 |
| 0 | 1 | 0 | 0 | 1 | 0 | 0 | 0 |
| 0 | 1 | 0 | 1 | 0 | 1 | 0 | 0 |
| 0 | 1 | 1 | 0 | 0 | 1 | 0 | 0 |
| 0 | 1 | 1 | 1 | 0 | 0 | 1 | 0 |
| 1 | 0 | 0 | 0 | 1 | 0 | 0 | 0 |
| 1 | 0 | 0 | 1 | 0 | 1 | 0 | 0 |
| 1 | 0 | 1 | 0 | 0 | 1 | 0 | 0 |
| 1 | 0 | 1 | 1 | 0 | 0 | 1 | 0 |
| 1 | 1 | 0 | 0 | 0 | 1 | 0 | 0 |
| 1 | 1 | 0 | 1 | 0 | 0 | 1 | 0 |
| 1 | 1 | 1 | 0 | 0 | 0 | 1 | 0 |
| 1 | 1 | 1 | 1 | 0 | 0 | 0 | 1 | where $I_1$, $I_2$, $I_3$ and $I_4$ represent the condition of amplifiers 28 to 31 respectively, (i.e., 1 represents $V_1$, $V_2$, $V_3$ or $V_4$ and 0 represents 0 volts). Signals $W_1$, $W_2$, $W_3$ and $W_4$ are transmitted to AND gates 34, 35, 36 and 37 as shown. The second input to each AND gate 34, 35, 36, 37 is, respectively, one of the signals 38 to 41. The latter signals are obtained from a resistance divider (not numbered), signal 38 here representing the full voltage level of sum signal $V_{33}$, signal 39 here representing one-half of the full voltage level of sum signal $V_{33}$, signal 40 here representing one-third of the full voltage level of sum signal $V_{33}$ and signal 41 here representing one-quarter of the full voltage level of sum signal $V_{33}$. It is noted here that only one of the AND gates 34, 35, 36, 37 may be enabled at any one time. The AND gated signals are transmitted to OR gate 44, such OR gate producing a signal 42, the voltage level of such signal representing in polar coordinates the angular deviation of the centroid of the object being detected. Signal 42 is resolved into its azimuthal and elevation components by sine/cosine potentiometer 43. Such potentiometer here is mechanically coupled to scanning system 11 as indicated so that, at time $t=0$ (FIG. 2A), its sine output is zero and its cosine output is a maximum. Consequently, as the scanning system 11 is rotated, the average value of signal 42 is changed sinusoidally and cosinusoidally in a conventional fashion to produce control signals for the guidance system (not shown) and the gimbal system (not shown) of the missile 8.

Figure 4:
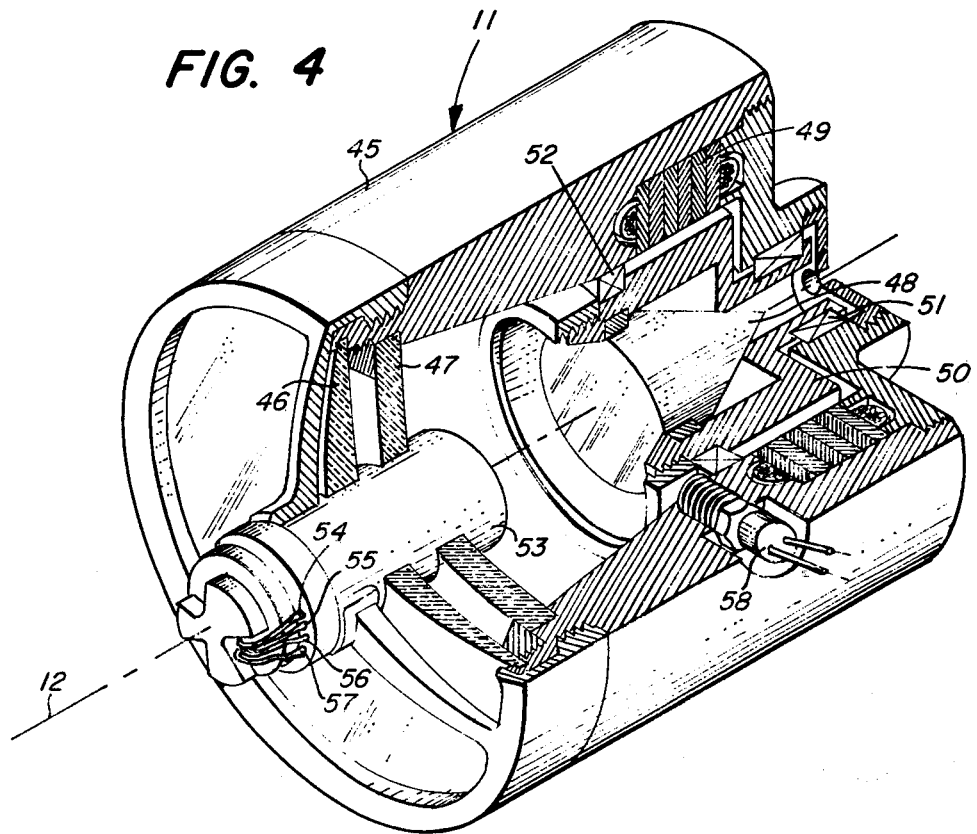
FIG. 4 is an isometric cut-away drawing of a preferred embodiment of an optical scanner according to the invention.

FIGS. 4 and 5 taken together show the details of a preferred scanning system 11 and its principles of operation, such scanning system 11 comprising: (a) a housing 45; (b) an optical focusing arrangement for focusing the portion of infrared energy entering the frontal portion of missile 8 onto image plane 19, such focusing arrangement including lenses 46, 47 and a Porro prism 48; (c) a scanning mechanism including a motor (not numbered) for rotating Porro prism 48 to effect rotation of the image of object 10 about boresight axis 12 (such motor being actuated by a power source, not shown, and including a stator 49, fixed as shown to housing 45, and a rotor 50, rotatably mounted to housing 45 by bearings 51, 52); (d) detector elements 20, 21, 22 and 23 contained within a detector Dewar and cryostat assembly 53, such assembly being mounted as shown to housing 45 coaxially with boresight axis 12, such detector elements being disposed in image plane 19 in the manner shown in FIG. 2A; (e) electrical wires 54, 55, 56 and 57 electrically coupling detector elements 20, 21, 22 and 23 to an electronic processor, e.g. that shown in FIG. 3, and (f) a magnetic pickoff 58 mounted to housing 45 and magnetically coupled to the peripheral portions of rotor 50 so as to produce an electrical reference signal when the optical system is aligned with reference axis 14 as shown in FIG. 2. The magnetic pickoff 58, of course, is the equivalent of the angle reference arrangement shown in FIG. 3.

The rotation of imaged object 10' about boresight axis 12 is accomplished by the rotation of Porro prism 48. The details of the optical property of Porro prisms are discussed in U.S. Pat. No. 3,449,035, J. J. Denaro, issued June 10, 1969 which is incorporated herein by reference. Briefly, a portion of the infrared energy radiating from object 10, here exemplified by the dashed line (not numbered) in FIG. 5 is reflected by the back side of Porro prism 48 as shown. The rotation of Porro prism 48 about boresight axis 12 has the effect of rotating each point defining the imaged object 10' (as illustrated in FIGS. 6A-6E) at a rate twice the rate of rotation of rotor 50, and such that each point defining the imaged object 10' rotates in a circle about boresight axis 12. FIG. 6A shows the imaged object 10' in the image plane 19 at $\theta=0°$, that is, when the magnetic pickoff 58 (FIG. 4) is aligned with reference axis 14. As is obvious to one of ordinary skill in the art, it follows that a 1:2 speed increase gearing mechanism (not shown) would be required for the electronic processor described in reference to FIG. 3 to maintain proper synchronization between scanning system 11 and sine/cosine potentiometer 43.

Figure 7:
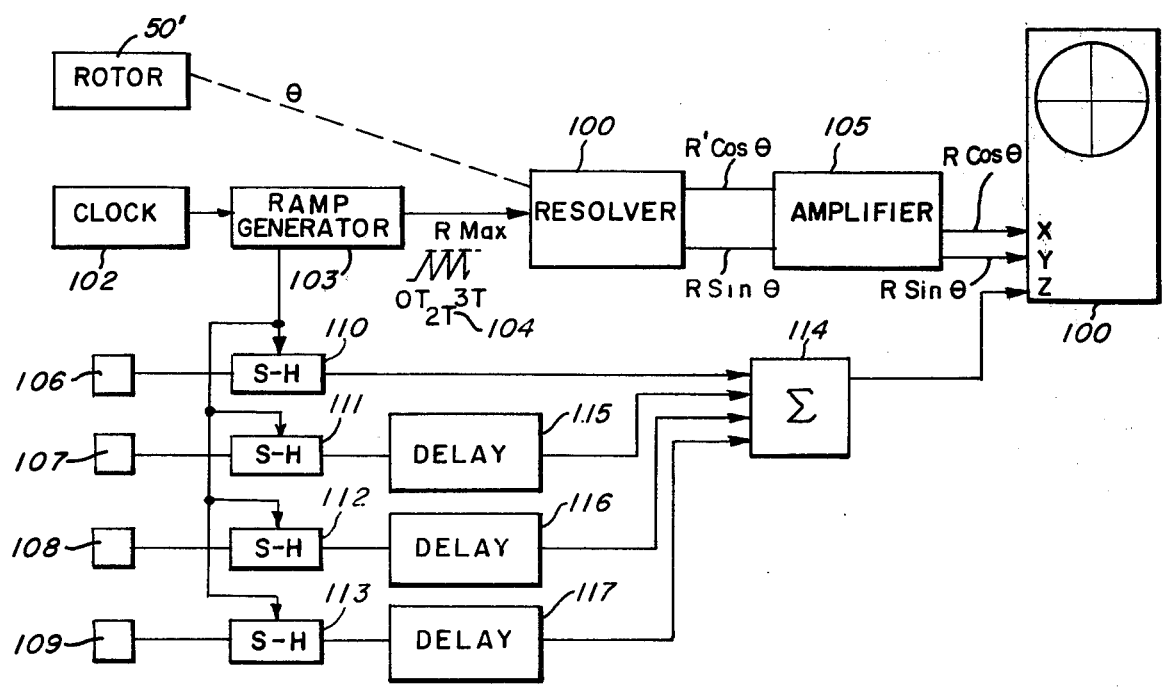
FIG. 7 is an electronic processor for use with the invention when the invention is used to display a two dimensional visual image of a received object.

FIG. 7 shows another embodiment of the invention wherein the scanning system 11 is used in conjunction with a cathode ray oscilloscope 100 to produce a visual two dimensional image of a scanned object. This type of display system is similar to a radar PPI display, one such PPI display being described in Radiation Laboratory Series #22 on Cathode Ray Tube Displays, pgs. 26-28. Rotor 50' is mechanically coupled to resolver 101, such coupling including a 1:2 speed increase gearing mechanism if a Porro prism is used in the optical system of the scanning system. Clock 102 transmits pulses to ramp generator 103 so that a sawtooth signal is produced by such generator, the voltage of such signal varying linearly from 0 volts to R max volts and periodically at a period T sec. The period, T sec, is significantly smaller than the period of rotation of rotor 50'. The ramp functions 104 are resolved into an azimuth component and an elevation component by resolver 101, such resolved signals being then amplified by amplifier 105 and appropriately applied to the horizontal X and vertical Y deflection plates, not shown, of cathode ray oscilloscope 100. It is obvious, then, that as rotor 50' rotates about boresight axis 12' the direction of each sweep on the cathode ray oscilloscope changes correspondingly. The intensity modulating signal for the cathode ray oscilloscope is generated in the following manner: between each sawtooth signal from the ramp generator 103 the output of all infrared detector elements 106, 107, 108 and 109 are sampled and stored by sample and hold circuits 110, 111, 112 and 113. Detector 106 is disposed closest to the rotational axis of rotor 50' so its signal out of sample and hold circuit 110 is transmitted directly to summing network 114 and then to the intensity electrode of cathode ray oscilloscope 100. The signals produced by sample and hold circuits 111, 112, 113, however, are delayed in time an amount T/4 sec., T/2 sec. and 3 T/4 sec., respectively, by delay circuits 115, 116 and 117 prior to the transmission of such signals to summing network 114. Consequently, when the rotor 50' is initially aligned in proper orientation with detector elements 106 to 109 as described in reference to FIG. 2, a visual two-dimensional reproduction of a scanned image will appear on oscilloscope 100.

The fact that the scanning system described has the capability of reproducing a two-dimensional image of a scanned object greatly enhances the value of such a system when used in a missile guidance system. Any passive infrared scanning system will be more responsive to the exhaust plume of a jet target rather than the jet aircraft itself because the strength of the infrared energy radiating from the plume is many times greater than the infrared energy radiating from the jet aircraft. Consequently, while it is true that, because of the warhead normally carried on board the missile, an actual collision of missile and jet aircraft is not required for a successful kill, the probability of kill of the missile system may be improved if the image of the jet aircraft and its plume is presented at a ground station and the missile is directed toward intercept by means of command signals from the ground station. Alternatively, it is possible with the invention, because an image of the plume may be obtained by conventional analog/digital electronic processing and if it is known that the plume is wider near the tailpipe of the jet aircraft, that the disclosed scanning system may be adapted to maintain the boresight axis of the scanning system at the wide end of the plume (or even to lead the plume). Such leading further increases the kill probability of the missile system.

It is also obvious to one of ordinary skill in the art, that the invention could easily be adapted to scan electromagnetic energy radiating from an object at frequencies other than those in the infrared portion of the spectrum.

It is felt, therefore, that this invention should not be restricted to the proposed embodiments herein described but rather should be limited only by the spirit and scope of the following claims.

What is claimed is:

1. An optical scanning system for determining the angular orientation of a point source of radiating electromagnetic energy relative to the boresight axis of such system, comprising:
   (a) an optical arrangement for focusing a portion of the radiating electromagnetic energy into an imaged point on an image plane, the distance of such imaged point from the boresight axis being proportional to the magnitude of the angular orientation of the point source from such axis;
   (b) a set of detector elements, each one of such detector elements therein being responsive to the focused electromagnetic energy and being disposed in the image plane along a common axis radial from such boresight axis, each detector element being at a different predetermined distance from the boresight axis;
   (c) a scanning mechanism for generating a relative rotation about the boresight axis between the imaged point and each one of the set of detector elements; and
   (d) processor means, coupled to each detector element and to the scanning mechanism, adapted to determine the sense and magnitude of the angular orientation of the point source from the boresight axis by determining:
      (1) the amount of the relative rotation when a detector element responds to the focused electromagnetic energy; and
      (2) which one of such detector elements is responsive.

2. An optical scanning system for determining the angular orientation of a point source of radiating electromagnetic energy relative to the boresight axis of such system as recited in claim 1, wherein the optical arrangement includes a first reflective surface in a first plane and a second reflective surface in a second plane, said planes being orthogonal to each other and intersecting with each other to form an edge, such edge being orthogonal to the boresight axis, whereby electromagnetic energy incident on the first reflective surface is reflected by the first reflective surface and then reflected by the second reflective surface into said image point at said image plane.

3. An optical scanning system for determining the angular orientation of a point source of radiating electromagnetic energy relative to the boresight axis of such system as recited in claim 2, wherein the scanning mechanism rotates the first and second reflective surfaces about the boresight axis.

4. An optical scanning system for determining the angular orientation of each point source of a plurality of sources radiating electromagnetic energy within a field of view relative to the boresight axis of such system, comprising:
   (a) an optical arrangement for focusing a portion of the electromagnetic energy radiating from each one of said point sources into corresponding imaged points on an image plane, the distance of each one of such imaged points from the boresight axis being proportional to the magnitude of the angular orientation of each one of the corresponding point sources from such axis;
   (b) A set of detector elements, each one of such detector elements therein being responsive to the focused electromagnetic energy and being disposed in the image plane along an axis radial from the boresight axis, and each one of such detector elements being at a different predetermined distance from the boresight axis;
   (c) a scanning mechanism for generating a relative rotation about the boresight axis between each one of such imaged points and the set of detector elements; and
   (d) processor means, coupled to each one of such detector elements and to the scanning mechanism adapted to determine the sense and magnitude of the angular orientation of each one of the plurality of sources by determining:
      (1) the amount of relative rotation when a detector element responds to the focused electromagnetic energy; and
      (2) which ones of such detector elements are responsive.

5. An optical scanning system for determining the angular orientation of each point source of a plurality of sources radiating electromagnetic energy within a field of view relative to the boresight axis of such system, as recited in claim 4, wherein the optical arrangement includes a first reflective surface in a first plane and a second reflective surface in a second plane, said planes being orthogonal to each other and intersecting with each other to form an edge, such edge being orthogonal to the boresight axis whereby electromagnetic energy incident on the first reflective surface is reflected by the first reflection surface and then reflected by the second reflective surface into said imaged points at said image plane.

6. An optical scanning system for determining the angular orientation of each point source of a plurality of sources radiating electromagnetic energy within a field of view relative to the boresight axis of such system, as recited in claim 5, wherein the scanning mechanism rotates the first and second reflective surfaces about the boresight axis.

7. An optical scanning system for determining the angular orientation of each point source of a plurality of sources radiating electromagnetic energy within a field of view relative to the boresight axis of such system, as recited in claim 6, wherein the processor includes means for generating a two-dimensional reproduction of each point source of the plurality of sources radiating electromagnetic energy within the field of view.

* * * * *